US005234335A

United States Patent [19]

Rinne

[11] Patent Number: 5,234,335

[45] Date of Patent: Aug. 10, 1993

[54] HYDRAULICALLY, PNEUMATICALLY OR MECHANICALLY DRIVEN POWER UNIT

[75] Inventor: Erkki Rinne, Espoo, Finland

[73] Assignee: Unicraft Oy, Helsinki, Finland

[21] Appl. No.: 761,754

[22] PCT Filed: Mar. 15, 1990

[86] PCT No.: PCT/FI90/00066

§ 371 Date: Sep. 16, 1991

§ 102(e) Date: Sep. 16, 1991

[87] PCT Pub. No.: WO90/10796

PCT Pub. Date: Sep. 20, 1990

[30] Foreign Application Priority Data

Mar. 16, 1989 [FI] Finland .................................. 890883

[51] Int. Cl.[5] .............................................. B29C 45/64

[52] U.S. Cl. ...................................... 425/406; 92/249; 100/267; 425/450.1

[58] Field of Search ............... 425/406, 450.1; 60/533; 92/249; 100/267; 72/465, 57, 63, 433.13

[56] References Cited

U.S. PATENT DOCUMENTS

| | | | |
|---|---|---|---|
| 2,756,707 | 7/1956 | Peters | 72/57 |
| 2,783,727 | 3/1957 | Hoffman | 72/57 |
| 3,120,205 | 2/1964 | Pfeiffer et al. | 72/63 |
| 4,093,175 | 6/1978 | Putzer et al. | 425/DIG. 44 |
| 4,344,313 | 8/1982 | Chachin et al. | 72/63 |

FOREIGN PATENT DOCUMENTS

| | | | |
|---|---|---|---|
| 252344 | 6/1963 | Australia | 252/344 |
| 2352914 | 4/1975 | Fed. Rep. of Germany . | |
| 0084736 | 4/1988 | Japan | 72/465 |
| 2023766 | 1/1980 | United Kingdom . | |
| 8902986 | 4/1989 | World Int. Prop. O. . | |

OTHER PUBLICATIONS

Meals, R. N. et al, Silicones, Reinhold, N.Y. (1959) pp. 130, 131, 132.

*Primary Examiner*—Tim Heitbrink
*Attorney, Agent, or Firm*—Christie, Parker & Hale

[57] ABSTRACT

A hydraulic or pneumatic power unit (1) includes at least one elastomer space (4) for a compressive-force producing/transmitting elastomer (5), the space (4) being formed so as to provide the space (4) with at least one constriction point between pressurizing side and compressing side, and that the elastomer space (4) is filled with elastomer (5) by casting elastomer in situ. Elastomer space (4) is preferably in direct communication with a pressurizing space (2) for a hydraulic fluid (7), the pressurizing space (2) being connected to a pressurizing unit (20). In order to operate the power unit in a die press, particularly for producing wide-bodied compressed articles, the press, including at least two body sections (10*a*) and at least two mold surfaces (8*a*) to be pressed against each other, the pressing of a compressed article is effected in a mold cavity (9) therebetween, and the power unit (1) is adapted to carry at least one mold surface (8*a*) relative to its body section (10*a*) towards the other mold surface (8*b*) through the intermediary of a support layer (13*a*). The support layer (13*a*) is located within the region between the mold surface (8*a*) and the elastomer space and/or press plate (3).

9 Claims, 7 Drawing Sheets

HYDRAULICALLY, PNEUMATICALLY OR MECHANICALLY DRIVEN POWER UNIT

BACKGROUND OF THE INVENTION

The present invention relates to a hydraulically, pneumatically or "mechanically" drivenpower unit and its application in a die or compression press, particularly for producing wide-bodied compressed articles.

A problem generally encountered in the manufacture of wide-bodied compressed articles is that, in order to produce as uniform a pressure as possible over the entire surface area of a piece to be compressed, the press molds must be relatively rigid and heavy in construction and, in addition, they usually require a plurality of separate pistons for producing a compressive force. One solution for eliminating this problem is described in the Applicant's earlier PCT application WO 89/02986.

SUMMARY OF THE INVENTION

The invention provides a hydraulically, pneumatically or mechanically driven power unit, particularly in a die press, in a manner that the actual molding surfaces can be made as thin and lightweight as possible and, in addition, that a piece to be pressed will be subjected to a pressure as uniform as possible over its entire surface area. In order to achieve this, a power unit of the invention is characterized in that an elastomer space is filled with elastomer by casting elastomer in situ. The application of a power unit of the invention in a die press especially for manufacturing wide-bodied compressed pieces, the press having at least two body sections and at least two molding surfaces to be pressed against each other for effecting the pressing of a compressed piece in a mold cavity therebetween, is characterized in that the power unit is adapted to carry at least one of the mold surfaces relative to its body section towards the other mold surface in a per se known manner through the intermediary of a support layer, said support layer being located in a region between the mold surface and the elastomer space and/or a press plate. The support layer is preferably elastic, made, e.g., of a two-component silicone or polyurethane.

One benefit gained by the application of a power unit of the invention in a die press is the uniform distribution of compression pressure through the intermediary of an elastic support layer over the entire surface area of a piece to be pressed.

Although a power unit of the invention is in this context described in association with a die press, it can of course be applied to many other machine parts and devices, such as couplings, brakes, connectors, sealings etc. One benefit offered by a power unit of the invention is e.g., that the system can be designed as a closed system and the risk of hydraulic oil spill is minimized, especially in "mechanical" application.

In view of the operation of a power unit, an essential feature is e.g., that elastomer does not adhere in the elastomer space and/or to the walls of elastomer passages so as to permit a moderate movement of elastomer in the elastomer space and/or passages under pressure. Elastomer behaves almost as a fluid in a sense that it is incompresssible, a difference from fluid being, however, that elastomer is self-restoring after the action of pressure is stopped. The conducted preliminary tests have indicated that a pressure of over 100 bars, nearly a complete equalization of pressure occurs in a passage having a diameter of about 5 mm and a length of about 500 mm throughout the entire passage. The non-adherence of elastomer to the walls of passages and elastomer spaces can be enhanced e.g., by means of various lubricants which are compatible with a particularly employed elastomer. Elastomer passages/spaces must usually be designed larger in volume than corresponding fluid passages. However, if necessary, the elastomer can be joined e.g., with a separate sealing layer or with a mechanical piston for a pressurizing medium by using an appropriate medium, such as Chemosil X 5201, available e.g., from Henkel AG (FRG). In addition, the elastomer space must be designed in a manner that elastomer cannot work its way out of the space. This design is effected e.g., in a manner that the region between the pressurizing side and operating (compressing) side of an elasomer space is provided with a section substantially narrower than the rest of the elastomer space whereby, whenever elastomer is subjected to the action of pressure, the pressure action prevailing in elastomer is directed in said narrow section against the walls of elastomer space, preventing elastomer from escaping out of the space. In addition, this narrow section produces a force effect assisting in the return of elastomer at the end of pressure action.

BRIEF DESCRIPTION OF THE DRAWINGS

The invention will now be described with reference made to the accompanying drawings, in which.

FIGS. *6a–6b* illustrate another embodiment for a power unit of the invention.

Figure 1:
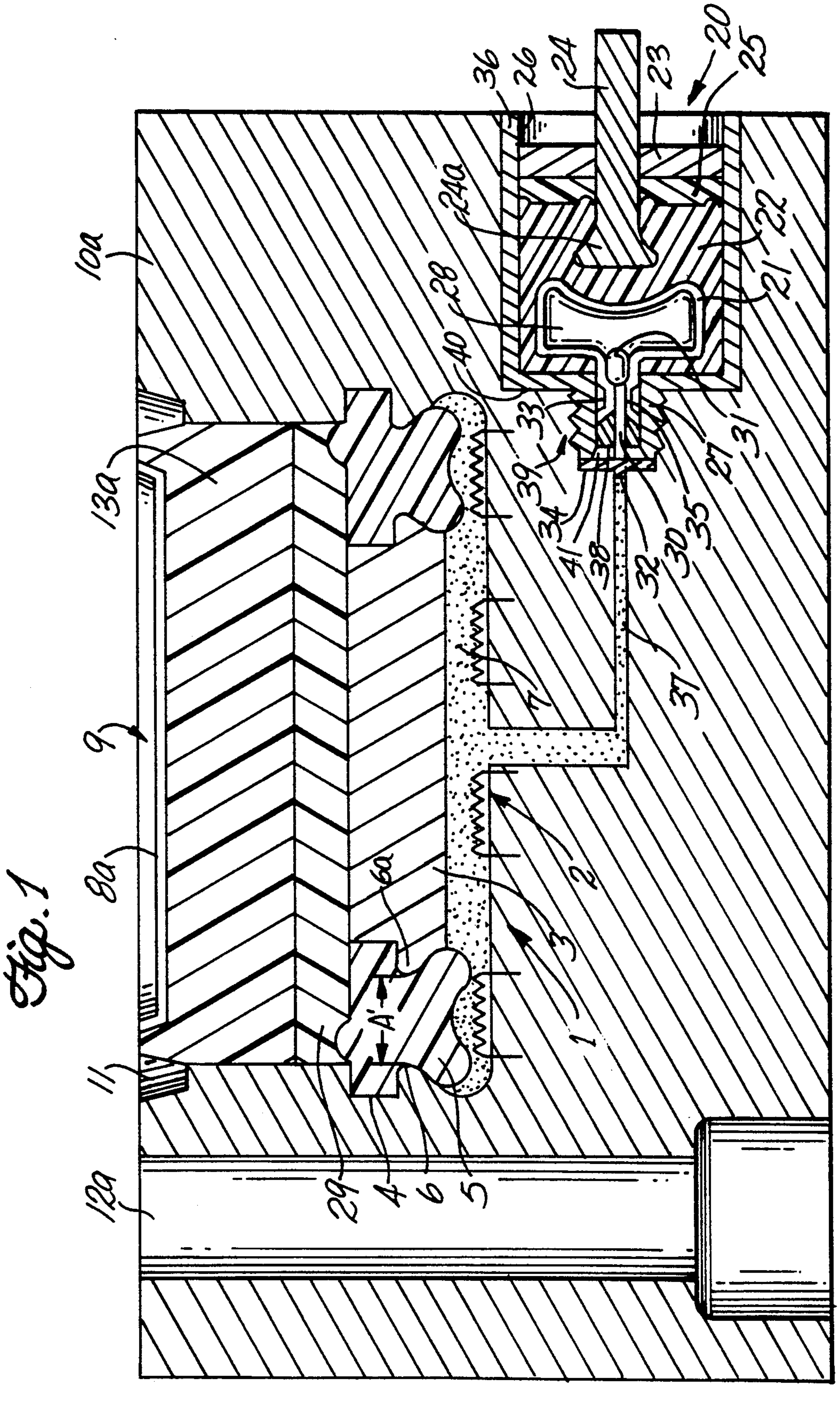
FIG. 1 illustrates the application of a power unit of the invention in one half-mold of a die press according to a first embodiment.
Figure 2:
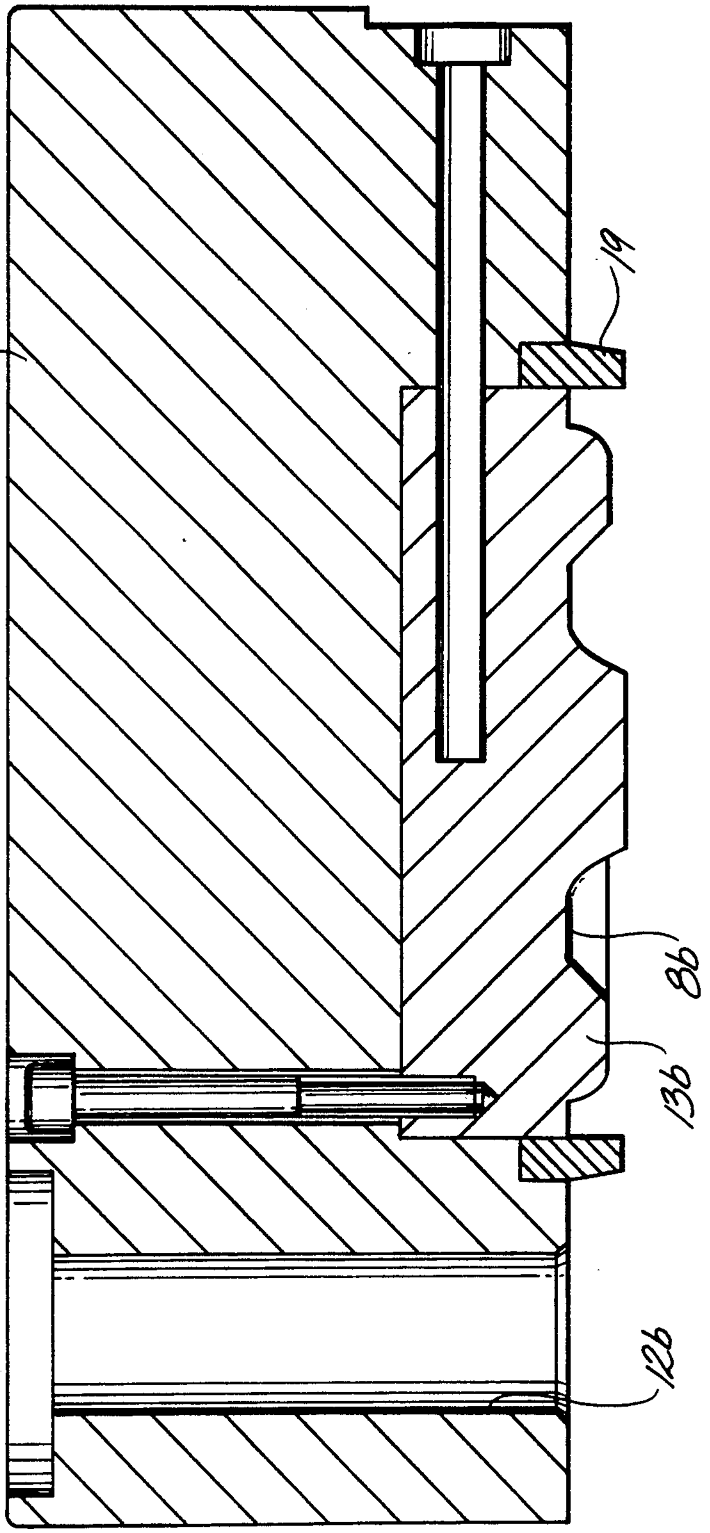
FIG. 2 shows the other half-mold of a die press according to the embodiment of FIG. 1.

Referring to FIGS. 1 and 2, a power unit 1 of the invention used in a die press comprises body sections 10*a* and 10*b* and two mold surfaces 8*a* and 8*b* to be pressed against each other, the mold surfaces providing therebetween a mold cavity 9 for effecting the compression of a molded piece. The faces of mold surfaces 8*a* and 8*b* directed away from the mold cavity are further provided with support layers 13*a* and 13*b*, respectively. Support layer 13*a* and 13*b* is preferably made of an elastic material or optionally of metal, wood, cement, foundry sand or the like. In the embodiment of FIG. 2, support layer 13*b* is made of the same material as mold surface 8*b* providing an integral structure therewith. The same way, mold surface 8*a* can also be made of the same material as its support layer 13*a*. In order to carry mold surface 8*a* towards the other mold surface 8*b*, the die press employs a hydraulically, pneumatically or mechanically driven power unit 1 for producing a compressive force. As shown in FIG. 1, the power unit has a cavity space in body section 10*a* with an elastomer space 4 being formed between a press place 3 and the edge of said cavity space, the space being filled with an elastomer layer 5. Between elastomer space 4 and the floor of the cavity space is further built a space 2 for hydraulic fluid 7 or compressed air or an elastomer medium producing the compressive force. In the context of this application, the term compressed air includes not just normal air, but also any generally pressurized gas or gas mixture. The edge of press plate 3 and the edge of elastomer space 4 in body section 10*a* are provided with a protrusion 6*a*, 6 in a manner that, in alignment with such protrusions 6*a*, 6, the elastomer space 4 will be provided with a section or region A substantially narrower than the rest of the space. Elastomer layer 5 is cast in situ in space 4. This in-situ casting together with narrow region A of space 4 results in a situation that a pressure effect applied to elastomer layer 5 causes the displacement of elastomer layer in elastomer space and the deformation of elastomer, the forces acting in the layer being applied against the walls of press place 3 and elastomer space 4, thus preventing the removal of elastomer layer 5 from the elastomer space. Between elastomer layer 5 and support layer 13*a* is further provided a sealing member 29, preferably made of a resilient material harder than elastomer 5, e.g., of teflon or a suitable metal or harder elastomer. The material used for press plate 3 can be e.g., thermosetting plastic or various metallic materials, e.g., copper.

When the power unit is operated by means of hydraulic oil, the power unit 1 is preferably connected by was of a hydraulic pipe or duct 37 to a hydraulic oil pressurizing unit 20. The pressurizing unit 20 preferably includes a sleeve-like body section 36 provided with a bottom portion 40 for building a cavity space 26 inside the body section 36. The bottom portion 40 is provided with a protrusion 39 which is fitted with an external threaded member and extends outwardly of cavity 26. Protrusion 39 is provided with a hole extending into cavity space 26, the hole being preferably fitted with an internal flange 41 at the end of protrusion 39 furthest away from cavity 26. In the cavity space 26 of body section 36 is formed a space 28 for hydraulic fluid 7, e.g., by means of an elastomer-made membrane 21 and a massive elastomer layer 22. In order to connect space 28 with duct 37, the bottom of cavity 26 is provided with a connector 27, comprising an internal-hole fitted connector tube 30, one end of which is provided with an enlargement 31 and the other end is provided with a threaded portion 32. The connector further includes a "bead" portion 33 and a separate sleeve member 34. Connector 27 is assembled in a manner that the bottom of membrane 21 is provided with a tubing member 35 which is forced on top of the connector pipe enlargement 31 so as to extend beyond said enlargement in longitudinal direction. This is followed by placing the bead portion 33 on top of connector pipe 30 from the end facing threaded portion 32 and by pushing it on top of tubing member 35 into the abutment with enlargement 31. The bead portion 33 is preferably formed by fitting both ends thereof with internal cones. This is followed by placing sleeve member 34 on top of connector tube 30 from threaded end 32 and by pushing it into the abutment with bead portion 33 in a manner that tubing member 35 remains between bead portion and sleeve member. The end of sleeve member 34 coming against bead portion 33 is preferably designed in its outer surface as a tapered configuration for facilitating the positioning of tubing member 35 between bead 33 and sleeve 34. Finally, the connector tube 30 is coupled with body section 36 by means of a nut 38 fastened to threaded portion 32 extending through the hole of protrusion 39, the nut being tightened to a suitable tightness. An elastomer layer 22 surrounds the entire membrane 21 up to connector 27. The region between layer 22 and the outer surface of body section 36 is further provided with a piston 23, and between piston 23 and layer 22 is fitted a sealing 25, made e.g., of teflon or copper. In addition, the unit 20 preferably includes a plunger 24 extending through piston 23 and sealing 25 into elastomer layer 22. The inner end of plunger 24 is provided with an enlargement 24*a* for an improved adherence to layer 22. The movement of piston 23 and plunger 24 is effected e.g., by means of conventional hydraulic or pneumatic or mechanical or the like equipment.

Space 28 can also be provided by mounting connector member 27 on body section 36 without a separate membrane 21 or its tubing portion. This is followed by placing in cavity 26 a piece made of e.g., stearine or a like material, serving as a mold for space 28. This is followed by casting in the cavity an elastomer layer 22 which is maintained under pressure until it is consolidated. Elastomer penetrates under pressure into a gap between the tapered surfaces of bead portion 33 and sleeve member 34 setting in its position. After the setting of elastomer, the piece of stearine making up the cavity 28 is melted by heating, whereby the stearine can be trickled away along the inside hole of connector pipe 30. Pressurizing unit 20 is preferably connected to a cavity formed in body section 10*a* and substantially matching the outer diameter of body section 36, the bottom of said cavity being provided with an internally threaded hole for protrusion 39. The pressurizing unit is fitted in position by screwing protrusion 39 into a threaded hole in the bottom of the cavity of body section 10*a*, the threaded hole being sealable by conventional means, e.g., by a teflon strip, whereby the threaded portion 32 of connector pipe 30 in connector 27, the threaded portion being preferably fitted with a tapered head, will be placed in a hydraulic tube or duct 37 formed in body section 10*a*. By means of this arrangement it is possible to design the assembly made up by pressurizing medium and power unit as a closed system, so that hydraulic oil will be in a channel confined by massive elastomer layers with practically no spilling hazard existing.

Figure 3:
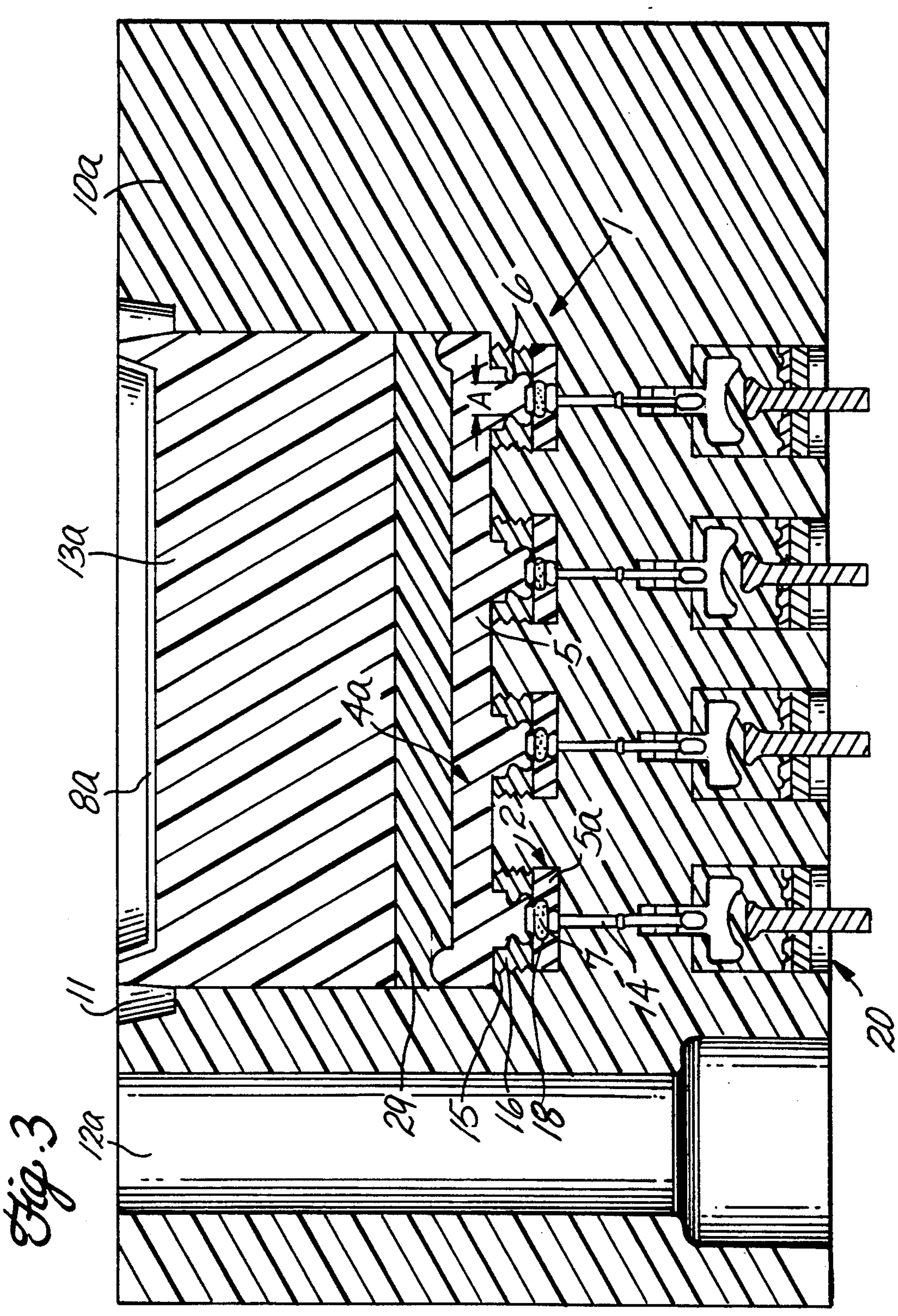
FIG. 3 illustrates the application of a power unit of the invention in one half-mold of a die press according to a second embodiment.

In the embodiment of FIG. 3, the space 4*a* of body section 10*a* is filled with elastomer 5, the compressive force thereon being produced by means of a plurality of power units 1 provided on the bottom of the cavity space. Power units 1 are provided by drilling holes 14 in the bottom of the cavity for a pressure medium. The upper end of holes 14 is provided with a wider threaded hole 15 fitted with a sleeve member 16 whose inner face is provided with a protrusion 6 the same way as the edges of press plate 3 and cavity shown in FIG. 1. Sleeve member 16 and the cavity are filled with elastomer 5 (e.g., two-component silicone). In addition, a space 2 between sleeve member 16 and the bottom of threaded hole 15 is filled with elastomer 5*a* with a tubing 18 embedded therein. Tubing 18 is connected to pressure medium hole 14 which is in communication with pressurizing unit 20. The illustrated hydraulic-oil pressurizing unit can also be replaced with any of the mechanical pressurizing means shown in FIGS. 4–7, wherein the pressure medium is elastomer. In order to seal the mold cavity, the body section 10*a* is provided with a sealing 19 which, with the die press in closed position, is placed in a recess 11 formed in body section 10*a*, thus extending over the gap between body sections 10*a* and 10*b*. The body section 10*b* can be further provided with an elastic rim layer for a possible replacement of support layer 13*b* of mold surface 8*b*.

The body sections 10*a* and 10*b* of a die press can be closed against each other by means of conventional presses and by using as fasteners e.g., mechanical clamping means, e.g., clamping bolts fitted in fixing holes 12*a* and 12*b*. In addition, the closing movement can be effected by using a power unit similar to that used for the displacement of mold surface 8*b*. A die press of the invention can also e further used for the manufacture of a mold, preferably by using foundry sand as support layer 13*a*.

The elastomer space can also be designed in a manner that the space is shaped substantially as a truncated cone, the larger base of such cone being preferably located on the pressurizing side, while the smaller base lies on the compression side (on the side of a mold section). the smaller base has preferably a diameter which is approximately 1/10–½ of that of the larger base. Most conveniently, the smaller base has a diameter which is approximately ⅓ of that of the larger base.

Providing the elastomer space with a constriction point is essential in view of preventing the escape of elastomer from the space without the vulcanization of elastomer to the edges of the space. In addition, the constriction point serves to produce a force restoring elastomer 5, 5*a* upon removal of the action of pressure.

Figure 4:
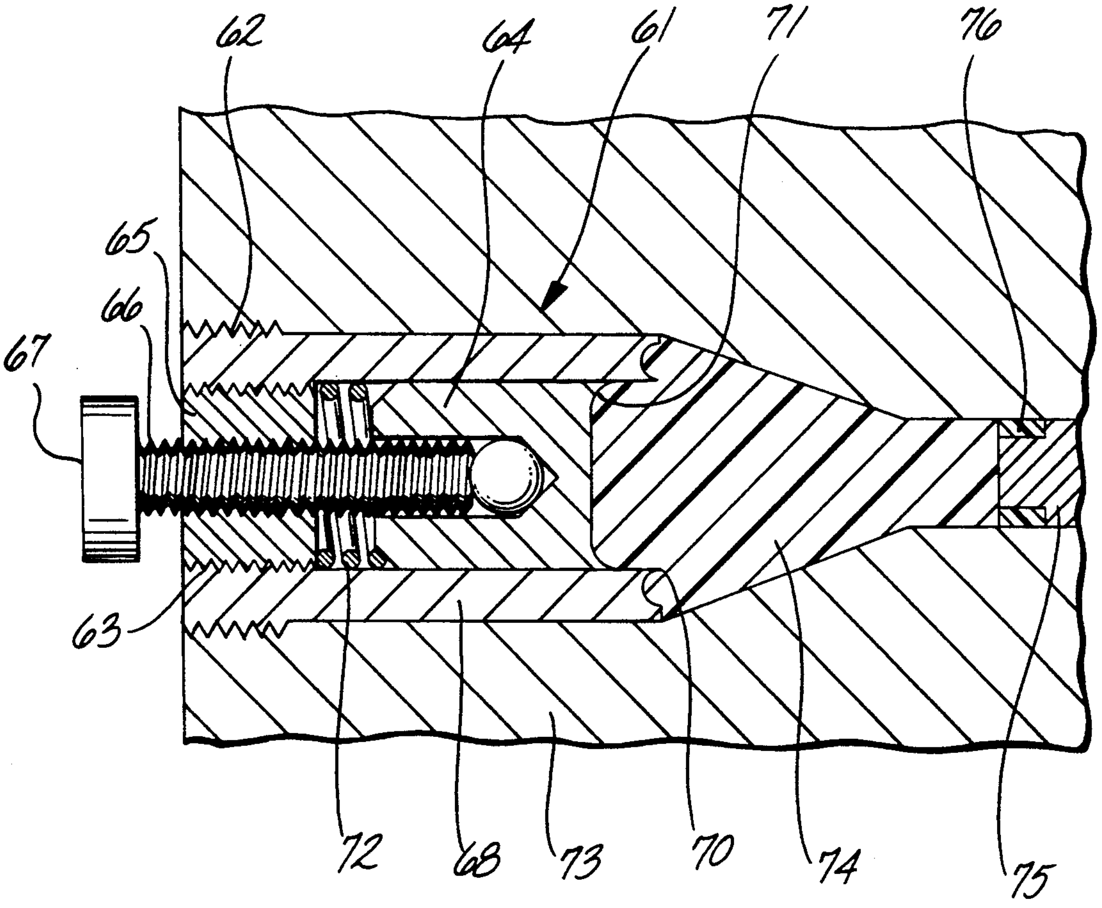
FIGS. 4–5 illustrate some of the mechanical pressurizing mediums.
Figure 5:
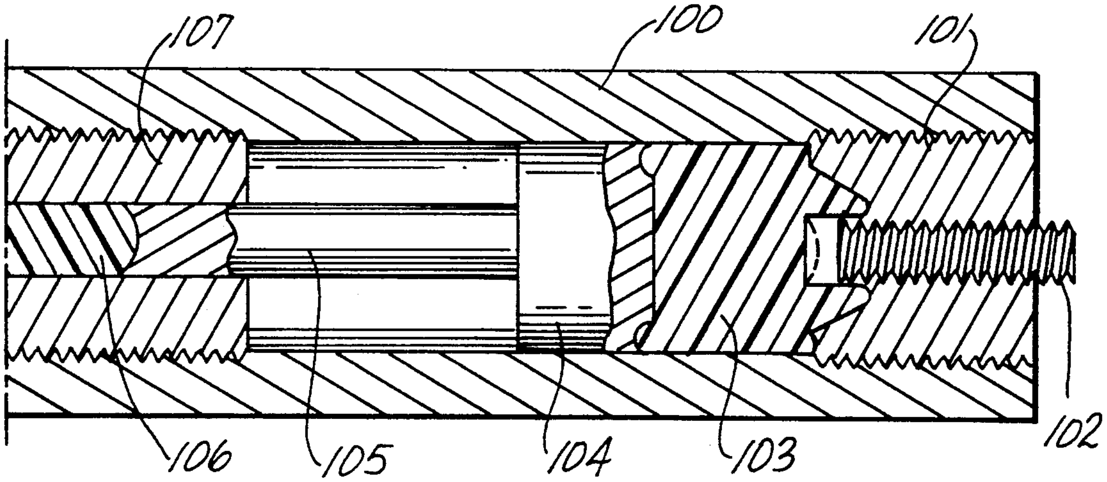

FIGS. 4–5 illustrates a few embodiments for mechanical pressurizing means employed in power units of the invention. In this context, a mechanical pressurizing means or medium refers to the fact that the pressurizing means applies pressure directly to an elastomer layer or elastomer medium. This type of mechanical pressurizing means can also be designed e.g., by using hydraulic oil between the elastomer medium and the actual power-unit operating elastomer layer, in which case the assembly can be referred to as a mechanical/ hydraulic drive.

In the embodiment of FIG. 4, a pressure means 61 comprises an outer piston member 68 provided with a threaded portion 62 and having an inner piston 64 fitted inside. The inner piston 64 is operated e.g., by means of a screw member 66, the screw member being connected through the intermediary of a spacer block 65 with a threading 63 to outer piston 68. Between spacer block 65 and inner piston 64 is further fitted a spring 72 which compensates for variations of the volume/pressure of elastomer induced by variations of temperature. Such volume/pressure control can also be effected e.g., by controlling temperature, whereby a spring 72 can be omitted.

Such a temperature control 72*a* is shown schematically in FIG. 1.

The screw member 66 is further provided with an external driving head 67. The inner piston can also be operated e.g., by means of an eccentric or some other per se known mechanical component. The outer piston member 68 is used for fastening the pressure means 61, e.g., to the body section 73 of a piece to be sealed, and it also serves as an initial pressure adjuster. The actual pressurization is performed by inner piston 64. In the case shown in FIG. 4, inner piston 64 acts on an elastomer layer 74 which, in turn, displaces a piston 75. Piston 75 is fitted with a sealing 76, made, e.g., of teflon, copper or a like sealing material. Piston 75 further acts on a pressurizing means or medium (hydraulic oil or elastomer), which medium is in communication with space 2 e.g., in the embodiment of FIG. 1, for pressurizing the elastomer 5 operating said power unit. Thus, a pressurizing means 61 replaces a pressurizing unit 20 shown in FIG. 1. Piston 75, along with its sealing 76, can also be omitted, whereby elastomer 74 is in direct communication e.g., with said space 2. The frontal surface of outer piston 68 facing elastomer space or medium 74 is preferably provided with a groove 69, the inner edge of outer piston 68 being formed with a lip portion 70 for preventing the passage of elastomer in between inner piston 64 and the internal surface of outer piston 68 as the inner piston 64 extends beyond the frontal surface of outer piston 68. The inner piston 64 is provided with a corresponding lip portion 71 for preventing the passage of elastomer in between inner and outer pistons as piston 64 is positioned inside said outer piston 68. Lip portion 71 can also be provided as a separate sealing which is attached to inner piston 64. Accordingly, lip portion 70 can be formed by means of a separate sealing ring which, in turn, is attached to outer piston 68. For a more uniform distribution of the pressure applied to elastomer, the elastomer layer 74 is preferably given a triangular shape. Alternatively, inner piston 64 can be made e.g., wedge-shaped at the end thereof facing elastomer.

FIG. 5 illustrates a solution with a plurality of various-sized pistons successively connected to each other. A spacer block 101 is fastened to a body section 100 e.g., by means of a threaded coupling, the spacer block being provided with a first piston or rod 102. The first piston acts on a first elastomer layer 103 which transmits the pressure to a second piston 104 having a surface area substantially larger than that of the first piston 102. The surface of second piston 104 facing away from first elastomer layer 103 is provided with a third piston 105 having a surface area substantially smaller than that of the second piston 104. The third piston 105 produces an increased pressure on a second elastomer layer 106 inside an inner tube 107, the piston combination or assembly serving as a pressure booster. The magnitude of boosting depends on the ratio of the piston surface areas. By contrast, the second elastomer space 106 is, e.g., in the embodiment of FIG. 1, in communication with space 27, instead of hydraulic oil for pressurizing elastomer layer 5.

Figure 6A:
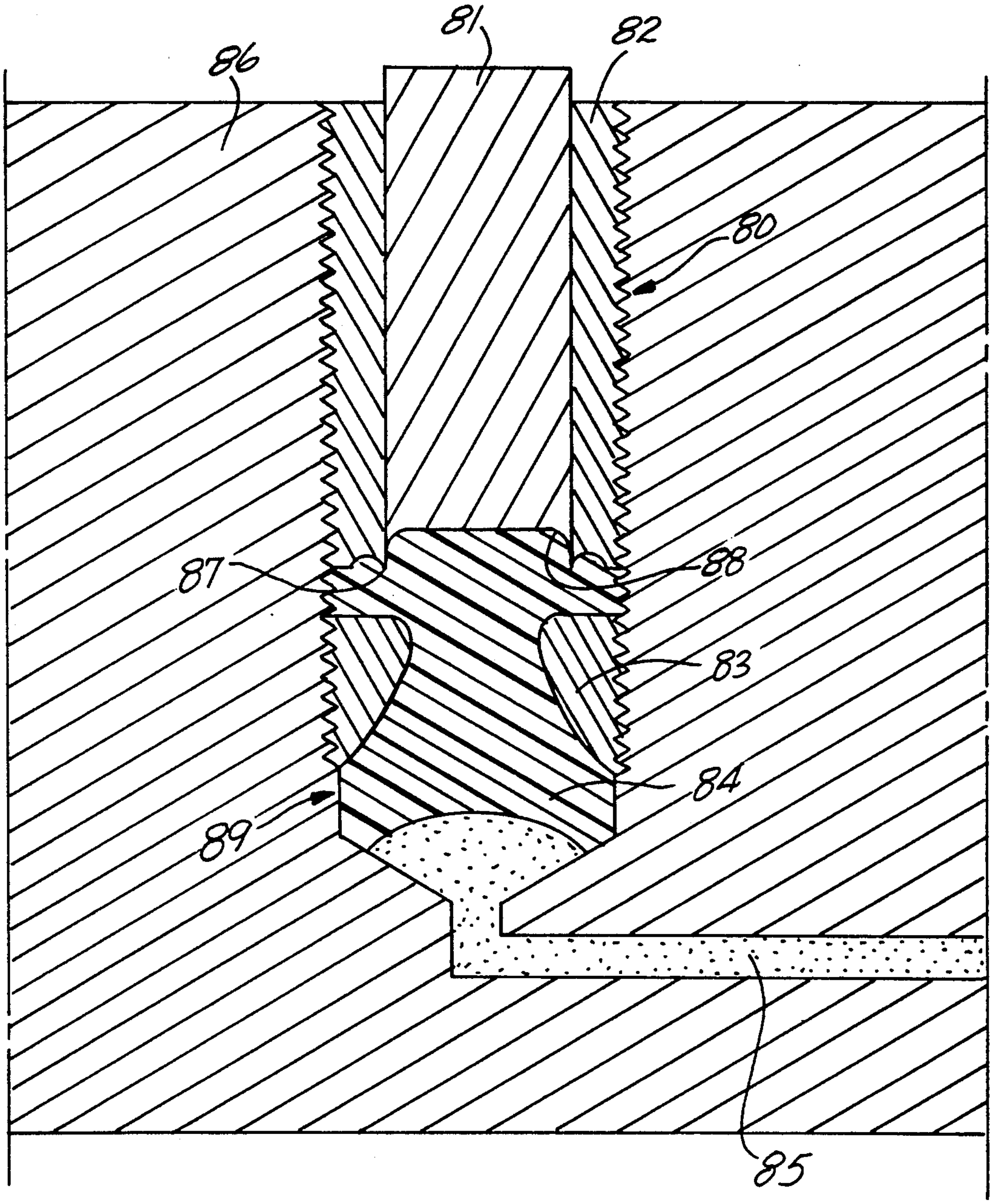
Figure 6B:
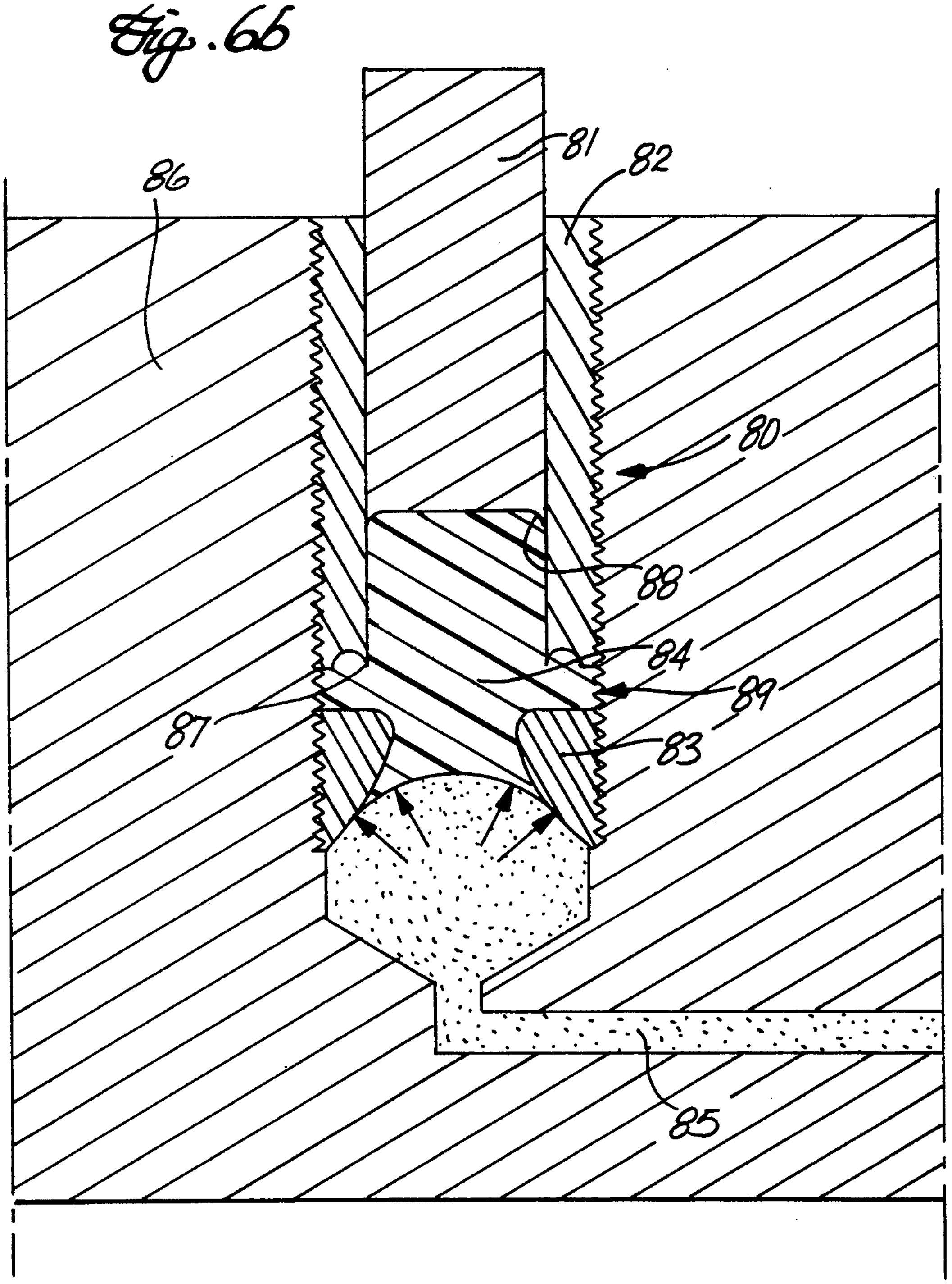

FIGS. 6*a* and 6*b* illustrate one power unit of the invention comprising separate components to be mounted on a body section. FIG. 6*a* shows the power unit in its initial position, and FIG. 6*b* shows the power unit as subjected to the action of pressure. According to the figures, a power unit 80 comprises an externally threaded cylindrical member 82 with an inner piston 81 adapted to be axially movable thereinside. The power unit further includes an externally threaded constriction block 83. When assembling the power unit, a body section 86 is provided with cylindrical member 82 and a threaded hole matching the male thread of constriction block 83, the bottom of said hole being provided with a duct for hydraulic oil 85. Assembling the power unit is effected in a manner that constriction block 83 is threaded to a desired location in the threaded hole of body section 86 followed by screwing cylindrical member 82 into the same threaded hole. Constriction block 83 and cylindrical member 82 are preferably placed in the threaded hole in a manner that the opposing frontal surfaces thereof are spaced from each other in axial direction. The installation of constriction block 83 and cylindrical member 82 is followed by casting elastomer 87*a* in an elastomer space 87 which is defined by the bottom of the threaded hole of body section 86, as well as by constriction block 83 and cylindrical member 82. The casting of elastomer layer is effected e.g., by placing on the bottom of the threaded hole a wax plug for preventing the passage of elastomer during the casting operation into the duct of hydraulic oil 85. During its setting, the elastomer layer 87a is compressed with an appropriate force by means of inner piston 81. The frontal surface of inner piston 81 coming against the elastomer layer is preferably treated with a binder which effects the vulcanization of elastomer layer fixedly to inner piston 81. After the setting of elastomer, the wax plug can be removed e.g., through the hydraulic-oil duct by vaporization or by using suitable chemicals. This is followed by filling the hydraulic-oil duct with hydraulic oil 85, whose pressurization can be effected, e.g., by using a pressurizing unit 20 shown in FIG. 1 or a pressurizing means 61 shown in FIG. 4. FIG. 6b illustrates the displacement of elastomer under the action of pressure. An essential feature in the design of constriction block ;83 is to bring the forces prevailing in elastomer to apply against the walls of constriction block 83 in a manner that elastomer is not capable of moving in its entire quantity over the narrow part of constriction block 83. As the displacement of elastomer over the narrow part is prevented, hydraulic oil 85 is not able to leak out of the assembly between the walls of elastomer layer 87a and the elastomer space. In addition, this constriction point produces a force returning elastomer to its original position upon the removal of pressure effect.

It is, of course, possible that a plurality of power units shown in FIGS. 6a and 6b be mounted on the same body section for moving, in addition to e.g., a die press, various punching means or the like for producing holes, cavities or the like in press pieces. A number of power units can also be combined with each other e.g., for transmitting a force from one place to another.

I claim:

1. A hydraulically, pneumatically or mechanically driven power unit, said power unit comprising:

means for forming at least one elastomer first space for a compressive force producing/transmitting elastomer and a pressurizing second space for a pressure medium, said first space having a pressurizing side and a compressing side and at least one constriction point within a region between the pressurizing side and the compressing side, wherein said first space is filled with elastomer by casting the elastomer in situ, said constriction point being formed by providing an edge of the means for forming the first space with an inward directed first protrusion and by providing a press plate in said first space substantially in a central area thereof, an edge of said press plate being fitted with a second protrusion substantially facing said first protrusion, and wherein the pressurizing second space is disposed directly in communication with the first space, said second space being in further communication with a pressurizing unit.

2. A power unit as set forth in claim 1, wherein said elastomer comprises two-component silicone or two-component polyurethane.

3. A power unit as set forth in claim 1, wherein said pressurizing second space and said pressurizing unit are arranged as a closed system, wherein said pressurizing unit comprises a third space defined therein for the pressure medium, said third space being defined by a membrane and elastomer layer, whereby the pressure medium is in a channel confined by the elastomer layer at one end of said channel and the press plate at the other end of said channel.

4. A power unit as set forth in claim 1, wherein said pressurizing unit comprises means for controlling the temperature of the elastomer.

5. In a die press for producing wide-bodied compressed articles, said press comprising at least two body sections and at least two mold surfaces to be pressed against each other, the pressing of a compressed article being effected in a mold cavity therebetween, and said press having a hydraulically, pneumatically or mechanically driven power unit, the improvement wherein said power unit moves at least one of the mold surfaces towards the other of the mold surfaces through the intermediary of a support layer, the power unit having at least one elastomer first space defined therein for a compressive force producing/transmitting elastomer, said first space having at least one constriction point within a region between a pressurizing side and a compressing side of the first space, wherein said first space is filled with elastomer by casting the elastomer in situ, said constriction point being formed by providing the edge of the first space with an inward directed first protrusion and by providing said first space substantially in a central area thereof with a press plate, whose edge is fitted with a second protrusion substantially facing said first protrusion, and wherein a pressurizing second space for a pressure medium is formed in the power unit directly in communication with the first space, said second space being in further communication with a pressurizing unit, said support layer being laid within the region between the at least one mold surface and the first space and the press plate.

6. A die press as set forth in claim 5, wherein said support layer comprises one of the following material: an elastic two-component silicone, foundry sand, concrete, or metal.

7. A die press as set forth in claim 5, wherein between said support layer and first space and press plate a sealing layer is disposed, said sealing layer comprising one of the following materials: a metal, or a resilient material harder than the elastomer in the first space.

8. A die press as set forth in claim 5, wherein said mold cavity is sealed at its rim portion with a seal which extends over a gap between body sections when said die press is in a closed position.

9. A hydraulically driven power unit, said power unit comprising:

a body section having a threaded hole, the bottom of said hole being provided with a duct for hydraulic oil, an externally threaded constriction block threaded to a desired location in said hole close to the bottom of said hole, and an externally threaded cylindrical member threaded in said hole spaced from said constriction block in an axial direction, said cylindrical member being provided with an inner piston mounted for axial movement therein, wherein the bottom of said hole, the constriction block, and the cylindrical member define an elastomer space for an in situ cast elastomer, said in situ cast elastomer being disposed in said elastomer space, and said duct is filled with hydraulic oil, whose pressurization is effected by using a pressurizing unit.

* * * * *